Patented Dec. 27, 1932

1,892,396

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF NONVOLATILE ORGANIC ACIDS

No Drawing.    Application filed September 7, 1928.   Serial No. 304,616.

This invention relates to the purification of non-volatile organic acids and more particularly to the separation of these products from other products, either acidic or non-acidic, which are volatile.

A number of organic acids, particularly dicarboxylic acids, such as phthalic acid, naphthalic acid, diphenic acid, maleic acid, etc., are either completely non-volatile as acids or are relatively non-volatile. In most cases they form volatile anhydrides. This is particularly true in the case of phthalic anhydride and naphthalic anhydride. It is frequently necessary to separate these anhydrides or acids from mixtures containing other organic compounds which are relatively volatile, for example, such monocarboxylic acids as benzoic acid or quinonic, aldehydic or other bodies. Two of the most important examples of such a mixture are mixtures of phthalic and benzoic acids from the catalytic production of benzoic acid from phthalic anhydride and naphthalic anhydride which are admixed with other oxidation products of acenaphthene. The invention will be described in more detail in connection with these two products, but it should be understood that what is described is applicable to other non-volatile organic acids which are capable of forming volatile anhydrides. The non-volatile acids, which are separated by the present invention, are formed from their anhydrides in the presence of water vapor at more or less definite temperatures or narrow ranges of temperature. For example, above 191° C., phthalic acid, which is non-volatile, is transformed into phthalic anhydride, which is volatile, and conversely in the presence of water vapor phthalic anhydride when cooled below 191° C. is transformed into the non-volatile phthalic acid. The temperatures are slightly different with substituted phthalic anhydrides. In the case of naphthalic anhydride, the temperature at which the acid changes into the anhydride is considerably lower, being between 140 and 150° C. According to the present invention mixtures of the non-volatile acid in question or its corresponding anhydride mixed with other compounds which do not show the change from volatile anhydride to non-volatile acid are subjected to the action of water vapor at a temperature sufficiently below the critical point to transform all the anhydride present into the acid or if the acid is originally present to assure its maintenance in the acid form and yet sufficiently high to maintain the accompanying impurities in a gaseous form. The non-volatile acid condenses out or if originally present remains in the non-gaseous state, whereas the impurities are removed with a current of steam. In this manner a clean separation of the acid may be obtained and the method is simple, cheap and reliable.

In carrying out the present invention, the critical temperature or rather the temperature zone which is below it may be approached from either direction, the results, of course, being the same and the particular alternative being determined by the manner in which the crude mixture is normally obtained. Thus, for example, if the crude mixture is in the form of a mixed gas at temperatures above the critical temperature, as in the case of exhaust gases from converters where phthalic anhydride is being transformed into benzoic acid or acenaphthene or similar products have been transformed into naphthalic anhydrides, it is normally easier and cheaper to bring the mixture down to the critical temperature or just below it in order to precipitate out the non-volatile acid. Where, however, the mixture is obtained in the form of a solution or in the form of a mixed solid or suspension, it is usually preferable to distill with superheated steam of the correct temperature, thus approaching the critical point from below rather than from above. Essentially, there is no difference between the two methods in principle and both are included in the present invention.

The water vapor present may be introduced in various forms. Where a gaseous mixture is to be cooled down to the critical temperature, steam may be present in the mixture as it comes from a converter or it may be introduced into the mixture, for example at a temperature sufficiently low to bring about the desired cooling. Where, however, the products are obtained in the solid form or in the form of a solution, distillation may be effected with superheated steam or a solution or suspension may be heated to the desired temperature under pressure, the water of the solution or suspension itself forming the necessary vapor. In such cases, if desired, hot air or gases may also be blown through, the particular method used being determined by considerations of cost and by the nature, particularly the volatility, of the accompanying impurities.

The present invention may be considered as a single process which is applied to a mixed material containing the ingredients to be separated or it may be a step in a process which produces the mixture in question as, for example, in the production of benzoic acid from phthalic anhydride by vapor-phase decarboxylation in the presence of air, steam, hydrogen, etc. or by the catalytic oxidation of acenaphthene and kindred substances to naphthalic anhydride.

The invention will be described in connection with the following specific examples which illustrate a few typical embodiments of the invention.

*Example 1*

A mixture of benzoic and phthalic acid containing approximately 85% benzoic acid and 15% phthalic acid is heated to a temperature between 150 and 175° C. and superheated steam at approximately the same temperature or slightly higher temperature is passed through. Benzoic acid sublimes off with the steam and can be removed therefrom by fractional condensation or any other suitable means. When the benzoic acid is separated out by fractional condensation the steam may be reused, if necessary after being heated to the desired temperature.

*Example 2*

A mixture of orthochlorbenzoic and the corresponding monochlorphthalic acid is heated to a temperature below 150–175° C. and superheated steam at approximately the same temperature is passed through. The chlorbenzoic acid sublimes over substantially free from chlorphthalic acid and may be separated from the steam in any suitable manner, as, for example, by fractional condensation.

*Example 3*

The effluent gases from a converter in which phthalic anhydride vapors and steam are passed over a carboxyl splitting catalyst at 400–420° C. which gases contain phthalic anhydride and benzoic acid in the proportion of about 20 to 80 or higher are treated with steam or a mixture of steam and water in sufficient quantity to reduce the temperature below 191° C. The phthalic acid condenses out and the benzoic acid remains in the vapor phase, where it can be separated by fractional condensation or by any other suitable means as by continuous treatment with organic solvents such as benzol, toluol and the like. Instead of producing benzoic acid from phthalic anhydride, it may be produced in a single operation from naphthalene by subjecting the latter to vapor phase catalytic oxidation to produce phthalic anhydride, then causing the reacted gases to contact with a carbon dioxide splitting catalyst with the addition of sufficient steam to carry out the reaction. The steam may, of course, be mixed with the original naphthalene vapors if desired.

*Example 4*

The effluent gases from a converter in which phthalic anhydride vapors and hydrogen or other reducing gases such as water gas, CO, etc., are passed over reduction and carbon dioxide splitting catalysts, which gases contain benzoic acid, phthalic anhydride, some benzaldehyde and traces of benzyl alcohol, together with carbon dioxide, water, and in some cases excess reducing gas are treated with steam in an amount and at a temperature sufficient to cool the whole mixture to a temperature below 191° C. The phthalic acid condenses out while the benzoic acid remains in vapor form and can be removed by fractional condensation or by any suitable means and, if necessary, purified by separation from any contaminating benzaldehyde or other reaction product.

*Example 5*

A hot solution of benzoic and phthalic acids is sprayed through a nozzle into a treatment chamber using superheated steam as a spraying medium, the temperature in the chamber being maintained at about 170° C. and suitable baffles being provided to intimately mix the steam with the sprayed acid mixture. Phthalic acid condenses out and can be removed from the treating chamber either periodically or continuously in the form of a solid, containing very little, if any, water. The steam carrying with it substantially all of the benzoic acid vapors is permitted to pass out from the treatment chamber through a suitable opening preferably baffled to prevent the passage of mechanically entrained phthalic acid. The vapors can be cooled to a temperature somewhat above the boiling point of water whereupon most of the benzoic acid condenses out carrying with it little, if any, water and the steam after suitable superheating can be reused. Instead of fractional condensation, the steam benzoic acid mixture can be passed through hot high-boiling solvents for benzoic acid, the temperature being maintained above 100° C. Any other suitable means may be used. If desired the steam may be diluted with inert gases such as air, nitrogen, carbon dioxide and the like.

Example 6

A mixture of benzoic acid and phthalic anhydride is vaporized and blown into a vessel counter to a blast of superheated steam, the temperature in the vessel being maintained below 191° C. The colliding streams of vapor are intimately mixed, if necessary by the provision of suitable baffling, and phthalic acid precipitates out. The steam, together with substantially all of the benzoic acid vapors, is permitted to pass out of the vessel and is suitably treated to remove benzoic acid therefrom, as described in the foregoing example.

Example 7

A gaseous mixture containing naphthalic anhydride, oxygen, nitrogen and steam, together with other oxidation products of acenaphthene, such as acenaphthylene, acenaphthaquinone and the like, is cooled down to a temperature slightly below 140° C. The naphthalic anhydride is transformed into and precipitates out as the acid, whereas acenaphthylene, acenaphthaquinone and other oxidation products of acenaphthene remain volatile and pass off in the gaseous form where they may be recovered by any suitable means.

Example 8

A mixture of naphthalic anhydride and other oxidation products of acenaphthene, such as acenaphthylene, acenaphthaquinone, bisacenaphthylidenedione, naphthalic acid, etc. is suspended in water and subjected to distillation with superheated steam at 135–140° C. with or without the presence of other gases, such as air, carbon dioxide or the like. The naphthalic acid remains in the form of the acid whereas the impurities which are volatile with steam at this temperature are removed practically quantitatively. When the last of the impurities have been removed, the naphthalic acid may be recovered by filtration as it is substantially insoluble in water.

Example 9

Acenaphthene or acenaphthylene is vaporized into an air steam containing about 30% by weight of steam and passed over a suitable oxidation catalyst, for example ferric vanadate admixed with potassium sulfate, at temperatures between 380 and 420° C. The effluent gases containing naphthalic anhydride together with small amounts of other oxidation products of acenaphthene are then cooled down to about 140° C., the naphthalic acid precipitating out and the impurities which are volatile with steam at this temperature being separated therefrom.

Instead of using acenaphthene or acenaphthylene, their halogen substituted products, such as chloracenaphthene or chloracenaphthylene, may be used producing a halogenated naphthalic anhydride.

What is claimed as new is:

1. A method of separating non-volatile organic acids which are capable of forming volatile anhydrides from relatively volatile organic acids or anhydrides, which comprises subjecting a mixture containing at least one compound included in the group consisting of non-volatile organic acids and anhydrides of non-volatile organic acids associated with other organic compounds volatile with steam to the action of steam at a temperature below that at which the non-volatile acids are transformed into their anhydrides and permitting the steam and volatile organic acids and other volatile impurities to leave the mixture.

2. A method according to claim 1, in which a mixture of effluent gases from a converter in which the anhydride of at least one non-volatile organic acid capable of forming a volatile anhydride is present admixed with organic impurities volatile with steam is cooled down in the presence of steam to a temperature below that at which the non-volatile acid is transformed into the anhydride.

3. A method of separating out a substance included in the group, naphthalic acids, naphthalic anhydrides, which comprises subjecting a mixture containing the substance included in the group, naphthalic acids, naphthalic anhydrides associated with organic impurities volatile with steam to a temperature below that at which naphthalic acid is transformed into the anhydride in the presence of steam whereby the impurities are removed from the naphthalic acid in a gaseous form.

4. A method of obtaining a substance included in the group, naphthalic acids, naphthalic anhydrides, which comprises oxidizing a substance included in the group consisting of acenaphthenes, substituted acenaphthenes, acenaphthylenes by catalytic vapor phase partial oxidation and cooling the reacted gases in the presence of steam to a temperature below that at which naphthalic anhydrides are transformed into naphthalic acids.

5. A method according to claim 4 in which at least part of the steam is present during the catalytic oxidation of the substance included in the group consisting of acenaphthenes, substituted acenaphthenes, acenaphthylenes.

Signed at Pittsburgh, Pennsylvania, this 4th day of September, 1928.

ALPHONS O. JAEGER.